United States Patent
Lin et al.

(10) Patent No.: US 11,836,214 B2
(45) Date of Patent: Dec. 5, 2023

(54) MATRIX CALCULATION DEVICE AND OPERATION METHOD THEREOF

(71) Applicant: NEUCHIPS CORPORATION, Hsinchu (TW)

(72) Inventors: Chiung-Liang Lin, Taichung (TW); Chao-Yang Kao, Hsinchu (TW)

(73) Assignee: NEUCHIPS CORPORATION, Hsinchu (TW)

( * ) Notice: Subject to any disclaimer, the term of this patent is extended or adjusted under 35 U.S.C. 154(b) by 473 days.

(21) Appl. No.: 17/033,940

(22) Filed: Sep. 28, 2020

(65) Prior Publication Data
US 2022/0058238 A1 Feb. 24, 2022

(30) Foreign Application Priority Data
Aug. 18, 2020 (TW) ................. 109128071

(51) Int. Cl.
*G06F 17/16* (2006.01)
*G06F 7/544* (2006.01)

(52) U.S. Cl.
CPC ............ *G06F 17/16* (2013.01); *G06F 7/5443* (2013.01)

(58) Field of Classification Search
CPC ............................... G06F 17/16; G06F 7/5443
See application file for complete search history.

(56) References Cited

U.S. PATENT DOCUMENTS

| 2019/0012296 A1 | 1/2019 | Hsieh et al. |
| 2019/0042195 A1* | 2/2019 | Kalsi .................. G06F 13/4234 |
| 2019/0065151 A1* | 2/2019 | Chen ..................... G06F 17/16 |

FOREIGN PATENT DOCUMENTS

| CN | 110633793 | 12/2019 |
| TW | 201714120 | 4/2017 |

* cited by examiner

*Primary Examiner* — Michael D. Yaary
(74) *Attorney, Agent, or Firm* — JCIPRNET

(57) ABSTRACT

A matrix calculation device including a storing unit, a multiply accumulate (MAC) circuit, a pre-fetch circuit, and a control circuit, and an operation method thereof are provided. The storing unit stores a first and second matrixes. The MAC circuit is configured to execute MAC calculation. The pre-fetch circuit pre-fetches at least one column of the first matrix from the storing unit to act as pre-fetch data, pre-fetches at least one row of the second matrix from the storing unit to act as the pre-fetch data, or pre-fetches at least one column of the first matrix and at least one row of the second matrix from the storing unit to act as the pre-fetch data. The control circuit decides whether to perform the MAC calculation on a current column of the first matrix and a current row of the second matrix through the MAC circuit according to the pre-fetch data.

16 Claims, 8 Drawing Sheets

MATRIX CALCULATION DEVICE AND OPERATION METHOD THEREOF

CROSS-REFERENCE TO RELATED APPLICATION

This application claims the priority benefit of Taiwan application serial no. 109128071, filed on Aug. 18, 2020. The entirety of the abovementioned patent application is hereby incorporated by reference herein and made a part of this specification.

BACKGROUND

Technical Field

The disclosure relates to a matrix calculation device and an operation method thereof.

Description of Related Art

In the operation of certain electronic circuits, matrix multiplication calculation is required. How to configure hardware circuits to effectively execute the matrix multiplication calculation is an important issue in this field.

SUMMARY

The disclosure provides a matrix calculation device and an operation method thereof aiming to enhance efficiency of matrix multiplication calculation.

In an embodiment of the disclosure, the matrix calculation device includes a storing unit, a multiply accumulate (MAC) circuit, a pre-fetch circuit, and a control circuit. The storing unit is adapted to store a first matrix and a second matrix. The MAC circuit is configured to execute MAC calculation. The pre-fetch circuit is coupled to the storing unit. The pre-fetch circuit pre-fetches at least one column of the first matrix from the storing unit to act as pre-fetch data, the pre-fetch circuit pre-fetches at least one row of the second matrix from the storing unit to act as the pre-fetch data, or the pre-fetch circuit pre-fetches at least one column of the first matrix and at least one row of the second matrix from the storing unit to act as the pre-fetch data. The control circuit is coupled to the storing unit, the MAC circuit, and the pre-fetch circuit. The control circuit decides whether to perform the MAC calculation on a current column of the first matrix and a current row of the second matrix through the MAC circuit according to the pre-fetch data.

In an embodiment of the disclosure, the operation method includes the following steps. At least one column of a first matrix is pre-fetched from a storing unit to act as pre-fetch data by a pre-fetch circuit, at least one row of the second matrix is pre-fetched from the storing unit by the pre-fetch circuit to act as the pre-fetch data, or at least one column of the first matrix and at least one row of the second matrix are pre-fetched from the storing unit by the pre-fetch circuit to act as the pre-fetch data. Further, whether to perform multiply accumulate calculation on a current column of the first matrix and a current row of the second matrix through a MAC circuit is decided by a control circuit according to the pre-fetch data.

To sum up, in the matrix calculation device and the operation method thereof provided by the embodiments of the disclosure, the contents of the first matrix and/or the contents of the second matrix may be pre-fetched to act as the pre-fetch data. According to the pre-fetch data, the matrix calculation device may decide whether to perform the MAC calculation on the current column of the first matrix and the current row of the second matrix. In this way, unnecessary MAC calculation may be reduced, and that efficiency of the matrix multiplication calculation may be enhanced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
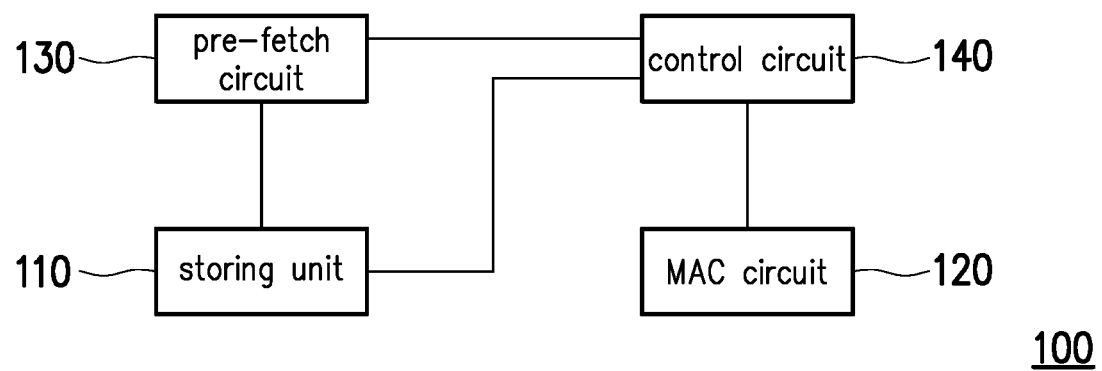
FIG. 1 is a schematic diagram of circuit blocks illustrating a matrix calculation device according to an embodiment of the disclosure.

FIG. 1 is a schematic diagram of circuit blocks of a matrix calculation device 100 according to an embodiment of the disclosure. With reference to FIG. 1, the matrix calculation device 100 includes a storing unit 110, a multiply accumulate (MAC) circuit 120, a pre-fetch circuit 130, and a control circuit 140. The control circuit 140 is coupled to the storing unit 110, the MAC circuit 120, and the pre-fetch circuit 130. The storing unit 110 may be a fixed or a movable random access memory (RAM) in any form, a read-only memory (ROM), a flash memory, a hard disk drive (HDD), a solid state drive (SSD), another similar device, or a combination of the foregoing devices. The storing unit 110 is adapted to store a first matrix and a second matrix.

In neural network calculation, a multiply accumulate (MAC) calculation circuit is used most of the time to perform matrix multiplication calculation. For instance, the control circuit 140 may perform matrix multiplication calculation through the MAC circuit 120. The control circuit 140 may fetch one column (hereinafter referred to as a current column) in a first matrix and one row (hereinafter referred to as a current row) in a second matrix from the storing unit 110 and transmits the current column and the current row to the MAC circuit 120. Generally, the MAC circuit 120 has a MAC calculation circuit array. Each MAC calculation circuit in the MAC calculation circuit array may perform MAC calculation on a corresponding element of the current column and on a corresponding element of the current row. Therefore, the MAC circuit 120 may perform the MAC calculation on the current column and the current row. After the control circuit 140 transmits all columns of the first matrix and all rows of the second matrix to the MAC circuit 120, a MAC calculation result of the MAC circuit 120 is a matrix multiplication calculation result of the first matrix and the second matrix.

For instance, in the process of neural network calculation, the matrix calculation device 100 may be required to calculate matrix multiplication calculation shown in Formula 1 below. Herein, a first matrix W may be a weight matrix of N*M, a second matrix IN may be an input matrix (data matrix) of M*1, and M and N are two integers defined according to design needs.

$$\begin{bmatrix} W_{11} & \cdots & W_{1M} \\ \vdots & \ddots & \vdots \\ W_{N1} & \cdots & W_{NM} \end{bmatrix} \times \begin{bmatrix} IN_1 \\ IN_2 \\ \vdots \\ IN_M \end{bmatrix} = \begin{bmatrix} \sum_{k=1}^{M} W_{1k} \times IN_k \\ \sum_{k=1}^{M} W_{2k} \times IN_k \\ \vdots \\ \sum_{k=1}^{M} W_{Nk} \times IN_k \end{bmatrix} \quad \text{Formula 1}$$

Figure 2:
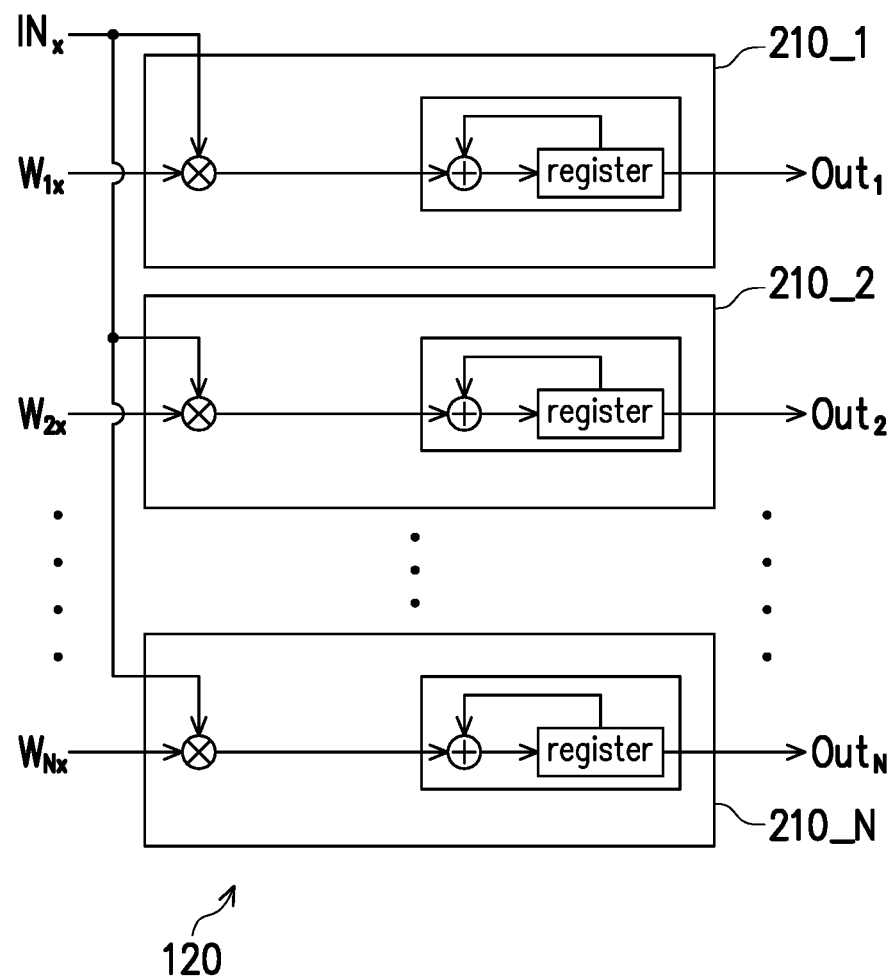
FIG. 2 is a schematic diagram describing circuit blocks of a multiply accumulate (MAC) circuit shown in 1 according to an embodiment of the disclosure.

FIG. 2 is a schematic diagram describing circuit blocks of the MAC circuit 120 shown in Formula 1 according to an embodiment of the disclosure. With reference to FIG. 1, FIG. 2, and Formula 1, the matrix calculation device 100 may multiply the first matrix W by a first vector (the second matrix IN) to generate a product matrix.

To be specific, the MAC circuit 120 shown in FIG. 2 includes a plurality of MAC calculation circuits 210_1, 210_2, . . . , and 210_N. The control circuit 140 may fetch current columns $W_{1x}$ to $W_{Nx}$ of the first matrix W shown in Formula 1 from the storing unit 110 and fetch a current row $IN_x$ of the second matrix IN shown in Formula 1 from the storing unit 110, and x is an integer from 1 to M. Next, the control circuit 140 may provide the current columns $W_{1x}$ to $W_{Nx}$ and the current row $IN_x$ to the MAC circuit 120 shown in FIG. 2. When the control circuit 140 decides to perform the MAC calculation on the current columns $W_{1x}$ to $W_{Nx}$ of the first matrix W and the current row $IN_x$ of the second matrix IN, any element of the current columns $W_{1x}$ to $W_{Nx}$ is provided to one corresponding MAC unit row (that is, one corresponding MAC calculation circuit among the MAC calculation circuits 210_1, 210_2, . . . , and 210_N) among a plurality of MAC unit rows of the MAC circuit 120, and the current row $IN_x$ is provided to one corresponding MAC unit column (that is, the MAC calculation circuits 210_1, 210_2, . . . , and 210_N) of the MAC circuit 120.

Each MAC calculation circuit among the MAC calculation circuits 210_1 to 210_N of the MAC circuit 120 may perform the MAC calculation on one corresponding element of the current columns $W_{1x}$ to $W_{Nx}$ and the current row $IN_x$ and stores a MAC result to a register. After the control circuit 140 transmits all columns of the first matrix W and all rows of the second matrix IN to the MAC circuit 120, a MAC calculation result of the MAC calculation circuits 210_1 to 210_N of the MAC circuit 120 is a matrix multiplication calculation result of the first matrix W and the second matrix IN shown in Formula 1.

For instance, during a first period (first stage), the MAC calculation circuits 210_1 to 210_N may multiply an element value of the first vector (first column $W_{11}$ to $W_{N1}$) of the first matrix W by an element value of a first row $IN_1$ of the second matrix IN and stores a product value into the corresponding register (to act as a MAC value). During a second period (second stage), the MAC calculation circuits 210_1 to 210_N may multiply an element value of a second vector (second column $W_{12}$ to $W_{N2}$) of the first matrix W by an element value of a second row $IN_2$ of the second matrix IN, adds the product value into the previous MAC value and obtains a new MAC value, and stores the new MAC value back into the corresponding register. By analogy, the MAC calculation may be performed until completion of calculation of the $M^{th}$ period ($M^{th}$ stage). After the MAC calculation of the $M^{th}$ period is completed, the registers of the MAC calculation circuits 210_1 to 210_N may provide a plurality of MAC values $Out_1$, $Out_2$, . . . , and $Out_N$ to obtain the matrix multiplication calculation result of the first matrix W and the second matrix IN shown by Formula 1.

In another instance, in the process of neural network calculation, the matrix calculation device 100 may be required to calculate matrix multiplication calculation shown in Formula 2 below. Herein, the first matrix W may be a weight matrix of N*M, the second matrix IN may be an input matrix (data matrix) of M*K, and N, M, and K are three integers defined according to design needs.

$$\begin{bmatrix} W_{11} & \cdots & W_{1M} \\ \vdots & \ddots & \vdots \\ W_{N1} & \cdots & W_{NM} \end{bmatrix} \times \begin{bmatrix} IN_{11} & \cdots & IN_{1k} \\ \vdots & \ddots & \vdots \\ IN_{M1} & \cdots & IN_{MK} \end{bmatrix} = \begin{bmatrix} O_{11} & \cdots & O_{1K} \\ \vdots & \ddots & \vdots \\ O_{N1} & \cdots & O_{NK} \end{bmatrix} \quad \text{Formula 2}$$

Figure 3:
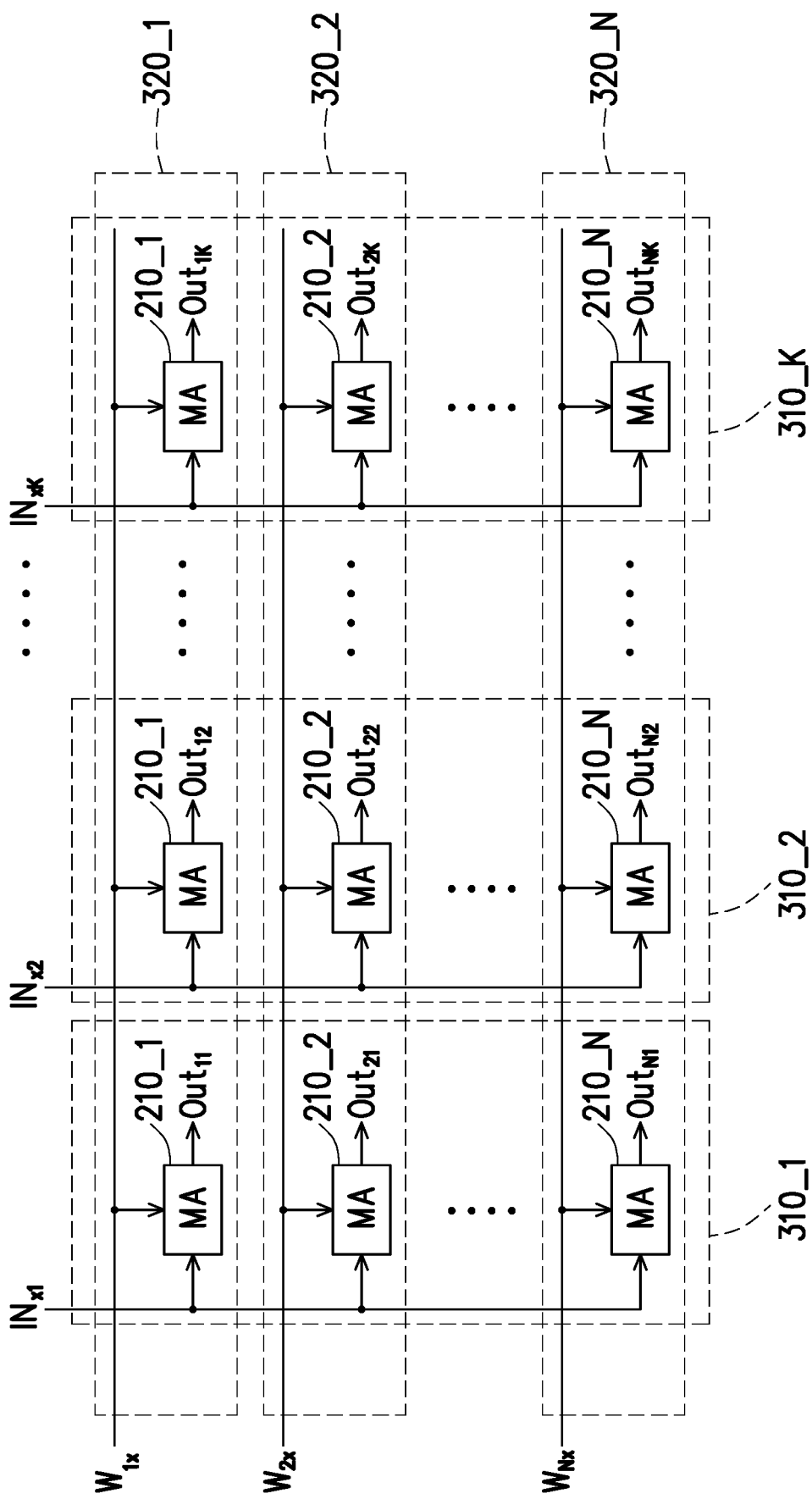
FIG. 3 is a schematic diagram describing circuit blocks of the MAC circuit shown in FIG. 1 according to another embodiment of the disclosure.

FIG. 3 is a schematic diagram describing circuit blocks of the MAC circuit 120 shown in FIG. 1 according to another embodiment of the disclosure. With reference to FIG. 1, FIG. 3, and Formula 2, the matrix calculation device 100 may multiply the first matrix W by the second matrix IN to generate a product matrix O. The MAC circuit 120 shown in FIG. 3 includes K MAC calculation circuit sets 310_1, 310_2, . . . , and 310_K, and each one of the MAC calculation circuit sets 310_1 to 310_K may be deduced according to description related to the circuits shown in FIG. 2 That is, each one of the MAC calculation circuit sets 310_1 to 310_K shown in FIG. 3 may include the MAC calculation circuits 210_1, 210_2, . . . , and 210_N. When the control circuit 140 decides to perform the MAC calculation on the current columns $W_{1x}$ to $W_{Nx}$ of the first matrix W and current rows $IN_{x1}$ to $IN_{xK}$ of the second matrix IN, any element of the current columns $W_{1x}$ to $W_{Nx}$ is provided to one corresponding MAC unit row among the MAC unit rows 320_1, 320_2, . . . , and 310_N of the MAC circuit 120, and any element of the current rows $IN_{x1}$ to $IN_{xK}$ is provided to one corresponding MAC unit column among the MAC unit columns (the MAC calculation circuit sets 310_1 to 310_K) of the MAC circuit 120. For instance, an element $W_{1x}$ of the current columns $W_{1x}$ to $W_{Nx}$ is provided to the MAC calculation circuit 210_1 (corresponding to the MAC unit row 320_1) of the MAC calculation circuit sets 310_1 to 310_K, and an element $IN_{x1}$ of the current rows $IN_{x1}$ to $IN_{xK}$ is provided to the MAC calculation circuits 210_1 to 210_N (corresponding to the MAC unit columns) of the MAC calculation circuit set 310_1.

During each stage, the control circuit 140 may fetch the current columns $W_{1x}$ to $W_{Nx}$ of the first matrix W shown in Formula 2 from the storing unit 110 and fetch the current rows $IN_{x1}$ to $IN_{xK}$ of the second matrix IN shown in Formula 2 from the storing unit 110, and x is an integer from 1 to M. Next, the control circuit 140 may provide the current columns $W_{1x}$ to $W_{Nx}$ and the current rows $IN_{x1}$ to $IN_{xK}$ to the MAC circuit 120 shown in FIG. 3. Each MAC calculation circuit among the MAC calculation circuit sets 310_1 to 310_K of the MAC circuit 120 may perform the MAC calculation on one corresponding element of the current columns $W_{1x}$ to $W_{Nx}$ and one corresponding element of the current rows $IN_{x1}$ to $IN_{xK}$ and stores the MAC result to the register. After the control circuit 140 transmits all columns of the first matrix W and all rows of the second matrix IN to the MAC circuit 120, the MAC calculation result of all MAC calculation circuits in the MAC calculation circuit sets 310_1 to 310_N of the MAC circuit 120 is the matrix multiplication calculation result (the product matrix O) of the first matrix W and the second matrix IN shown in Formula 2.

For instance, during the first period (first stage), the MAC calculation circuit set 310_1 may multiply an element value of the first column $W_{11}$ to $W_{N1}$ of the first matrix W by an element value $IN_{11}$ of the first row $IN_{11}$ to $IN_{1K}$ of the second matrix IN. The MAC calculation circuit set 310_2 may multiply an element value of the first column $W_{11}$ to $W_{N1}$ of the first matrix W by an element value $IN_{12}$ of the first row $IN_{11}$ to $IN_{1K}$ of the second matrix IN. Further, the MAC calculation circuit set 310_K may multiply an element value of the first column $W_{11}$ to $W_{N1}$ of the first matrix W by an element value $IN_{1K}$ of the first row $IN_{11}$ to $IN_{1K}$ of the second matrix IN and stores the product value into the corresponding register (to act as a MAC value). During the second period (second stage), the MAC calculation circuit set 310_1 may multiply an element value of the second column $W_{12}$ to $W_{N2}$ of the first matrix W by an element value $IN_{21}$ of the second row $IN_{21}$ to $IN_{2K}$ of the second matrix IN. The MAC calculation circuit set 310_2 may multiply an element value of the second column $W_{12}$ to $W_{N2}$ of the first matrix W by an element value $IN_{22}$ of the second row $IN_{21}$ to $IN_{2K}$ of the second matrix IN. The MAC calculation circuit set 310_K may multiply an element value of the second column $W_{12}$ to $W_{N2}$ of the first matrix W by an element value $IN_{2K}$ of the second row $IN_{21}$ to $IN_{2K}$ of the second matrix IN, adds the product value into the previous MAC value and obtains new a MAC value, and stores the new MAC value back into the corresponding register. By analogy, the MAC calculation may be performed until completion of calculation of the $M^{th}$ period ($M^{th}$ stage). After the MAC calculation of the $M^{th}$ period is completed, the register of the MAC calculation circuit set 310_1 may provide a plurality of MAC values $Out_{11}$, $Out_{21}$, ..., and $Out_{N1}$. The register of the MAC calculation circuit set 310_2 may provide a plurality of MAC values $Out_{12}$, $Out_{22}$, ..., and $Out_{N2}$. Further, the register of the MAC calculation circuit set 310_K may provide a plurality of MAC values $Out_{1K}$, $Out_{2K}$, ..., and $Out_{NK}$ to obtain the matrix multiplication calculation result (product matrix O) of the first matrix W and the second matrix IN shown by Formula 2.

In fact, in various application scenarios, all element values of at least one column of the first matrix W may all be 0, and/or all element values of at least one row of the second matrix IN may all be 0. For instance, in neural networks, the output of a rectified linear unit (ReLU) function in an activation function is a sparse matrix most of the time. In a case that the second matrix IN is a sparse matrix, all element values of the current row $IN_{x1}$ to $IN_{xK}$ of the second matrix IN may all be 0. When all the element values are 0, it means that the calculation results (the product values) of a certain time point are all 0.

A calculation example of the MAC circuit 120 shown in FIG. 3 is provided as follows. It is assumed that the MAC circuit 120 shown in FIG. 3 performs the matrix multiplication calculation shown by Formula 3 provided as follows. Formula 3 may be treated as an example of Formula 2 (the N value is 3, the M value is 8, and the K value is 3), such that Formula 3 may be deduced according to description related to Formula 2. Table 1 is a calculation example of Formula 3 performed by the matrix calculation device 100 without the operation shown in FIG. 4. With reference to Table 1, Formula 3, FIG. 1, and FIG. 3 together, the MAC circuit 120 shown in FIG. 3 receives (fetches) element values "11, 21, 31" of the first column $W_{11}$ to $W_{N1}$ of the first matrix W and element values "0, 0, 0" of the first row $IN_{11}$ to $IN_{1K}$ of the second matrix IN during a period (stage) $T_1$ shown in Table 1 to perform the MAC calculation and then stores the product values to the corresponding registers (to act as the MAC values). Next, during a period (stage) $T_2$ shown in Table 1, the MAC circuit 120 receives element values "12, 22, 32" of the second column $W_{12}$ to $W_{N2}$ of the first matrix W and element values "2, 2, 0" of the second row $IN_{21}$ to $IN_{2K}$ of the second matrix IN to perform the MAC calculation, adds the product values into the previous MAC values and obtains new MAC values, and then stores the new MAC values back into the corresponding registers. By analogy, calculation may be performed until completion of a period (stage) $T_8$ shown in Table 1.

$$\begin{bmatrix} 11 & 12 & 13 & 14 & 15 & 16 & 17 & 18 \\ 21 & 22 & 23 & 24 & 25 & 26 & 27 & 28 \\ 31 & 32 & 33 & 34 & 35 & 36 & 37 & 38 \end{bmatrix} \times \begin{bmatrix} 0 & 0 & 0 \\ 2 & 2 & 0 \\ 0 & 0 & 0 \\ 0 & 0 & 0 \\ 0 & 0 & 0 \\ 6 & 6 & 6 \\ 0 & 0 & 0 \\ 8 & 8 & 8 \end{bmatrix} = \quad \text{Formula 3}$$

$$\begin{bmatrix} O_{11} & O_{12} & O_{13} \\ O_{21} & O_{22} & O_{23} \\ O_{31} & O_{32} & O_{33} \end{bmatrix}$$

TABLE 1

One Calculation Example of Formula 3 Performed by Matrix Calculation Device 100

| Period | Fetching $W_{1x}$ to $W_{Nx}$ | Fetching $IN_{x1}$ to $IN_{xK}$ |
| --- | --- | --- |
| $T_1$ | 11, 21, 31 | 0, 0, 0 |
| $T_2$ | 12, 22, 32 | 2, 2, 0 |
| $T_3$ | 13, 23, 33 | 0, 0, 0 |
| $T_4$ | 14, 24, 34 | 0, 0, 0 |
| $T_5$ | 15, 25, 35 | 0, 0, 0 |
| $T_6$ | 16, 26, 36 | 6, 6, 6 |
| $T_7$ | 17, 27, 37 | 0, 0, 0 |
| $T_8$ | 18, 28, 38 | 8, 8, 8 |

From Table 1, it may be seen that the element values of the current row $IN_{x1}$ to $IN_xK$ fetched by the MAC circuit 120 during periods $T_1$, $T_3$, $T_4$, $T_5$, and $T_7$ are all 0, such that the product values of the MAC calculation performed by the MAC calculation circuit during the periods $T_1$, $T_3$, $T_4$, $T_5$, and $T_7$ are all 0. The "product values are all 0" means that the MAC calculation of this time does not change the MAC value, that is, the MAC calculation of this time is redundant. In other words, calculation performed by the MAC circuit 120 during the periods $T_1$, $T_3$, $T_4$, $T_5$, and $T_7$ shown in Table 1 is in vain.

Figure 4:
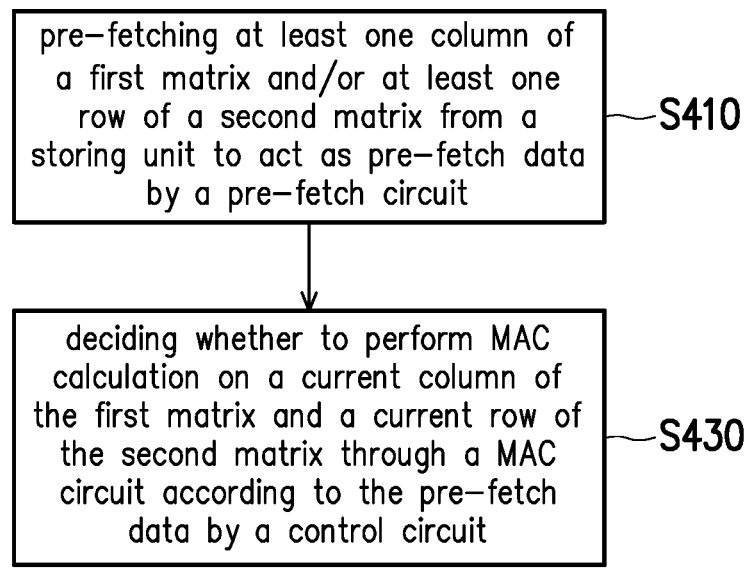
FIG. 4 is a schematic flow chart illustrating an operation method of the matrix calculation device according to an embodiment of the disclosure.

FIG. 4 is a schematic flow chart illustrating an operation method of the matrix calculation device 100 according to an embodiment of the disclosure. With reference to FIG. 1 and FIG. 4, the pre-fetch circuit 130 is coupled to the storing unit 110 and pre-fetches at least one column of the first matrix W and/or at least one row of the second matrix IN from the storing unit 110 to act as pre-fetch data (step S410). The pre-fetch circuit 130 may provide the pre-fetch data to the control circuit 140.

Next, the control circuit 140 decides whether to perform the MAC calculation on a current column of the first matrix W and a current row of the second matrix IN through the MAC circuit 120 according to the pre-fetch data (S430). For instance, in some embodiments, the control circuit 140 may determine whether contents of the current column of the first matrix W are all 0 according to the pre-fetch data of step S410, so as to decide whether to skip the MAC calculation performed on the current column of the first matrix W and the current row of the second matrix IN. Alternatively, in some other embodiments, the control circuit 140 may determine whether contents of the current row of the second matrix IN are all 0 according to the pre-fetch data of step S410, so as to decide whether to skip the MAC calculation performed on the current column of the first matrix W and the current row of the second matrix IN.

For instance, taking Table 1 and Formula 3 as an example, it is assumed that the pre-fetch data includes the first row $IN_{11}$ to $IN_{1K}$ and the second row $IN_{21}$ to $IN_{2K}$ of the second matrix IN in some embodiments. Since it is shown in the pre-fetch data that the element values of the first row $IN_{11}$ to $IN_{1K}$ (the current row) of the second matrix IN are all 0, the control circuit 140 may decide to skip the MAC calculation performed on the current column $W_{11}$ to $W_{N1}$ and the current row $IN_{11}$ to $IN_{1K}$. Since it is shown in the pre-fetch data that the element values of the second row $IN_{21}$ to $IN_{2K}$ (the current row) of the second matrix IN are not all 0, the control circuit 140 may decide to perform the MAC calculation performed on the current column $W_{12}$ to $W_{N2}$ and the current row $IN_{21}$ to $IN_{2K}$ through the MAC circuit 120. Accordingly, the MAC circuit 120 may save the $T_1$ period shown in Table 1. Performance may thus be effectively enhanced as calculation of the $T_1$ period shown in Table 1 is skipped.

Figure 5:
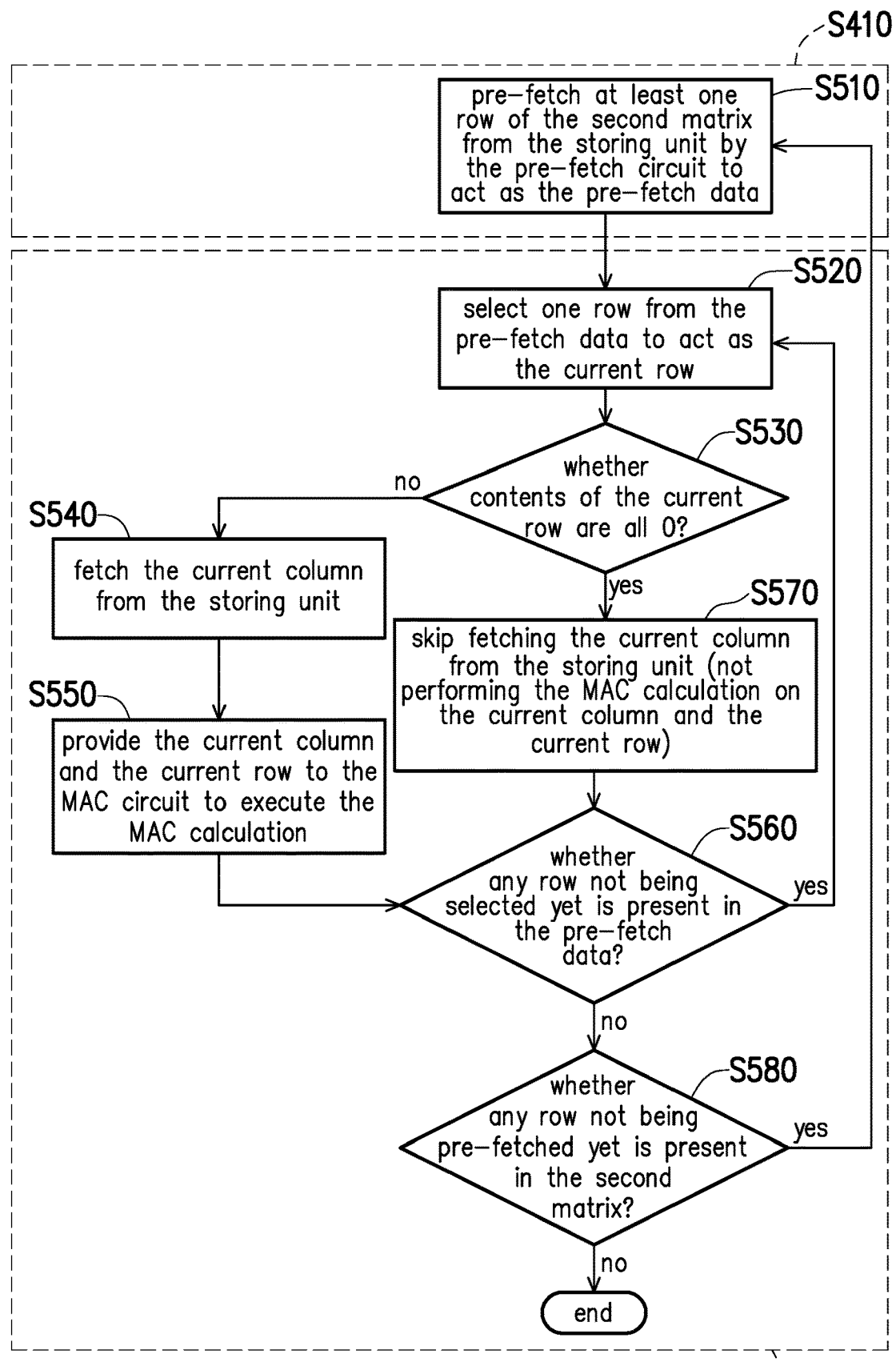
FIG. 5 is a schematic flow chart describing the steps shown in FIG. 4 according to an embodiment of the disclosure.

FIG. 5 is a schematic flow chart describing step S410 and step S430 shown in FIG. 4 according to an embodiment of the disclosure. Step S410 shown in FIG. 5 includes step S510, and step S430 shown in FIG. 5 includes steps S520, S530, S540, S550, S560, S570, and S580. In step S510, the pre-fetch circuit 130 may pre-fetch at least one row of the second matrix IN from the storing unit 110 to act as pre-fetch data. The number of rows to be pre-fetched by the pre-fetch circuit 130 in one batch from the storing unit 110 may be decided according to design needs. In an extreme example, the pre-fetch circuit 130 pre-fetches one row of the second matrix IN in one batch from the storing unit 110 to act as the pre-fetch data. In another extreme example, the pre-fetch circuit 130 pre-fetches all rows of the second matrix IN in one batch from the storing unit 110 to act as the pre-fetch data.

In step S520, the control circuit 140 may select one row to act as the current row $IN_{x1}$ to $IN_{xK}$ from the pre-fetch data of step S510. In a case that the pre-fetch data includes only one single row, step S520 and step S560 may be skipped according to design needs. The pre-fetch data shown in step S510 may include the current row $IN_{x1}$ to $IN_{xK}$ of the second matrix IN. As such, in step S530, the control circuit 140 may check the pre-fetch data, so as to determine whether contents (all element values) of the current row $IN_{x1}$ to $IN_{xK}$ of the second matrix IN are all 0.

When the contents of the current row $IN_{x1}$ to $IN_{xK}$ of the second matrix IN in the pre-fetch data are not all 0 ("no" is determined in step S530), the control circuit 140 may perform step S540. In step S540, the control circuit 140 may fetch the current column $W_{1x}$ to $W_{Nx}$ of the first matrix W from the storing unit 110. In step S550, the control circuit 140 may provide the current column $W_{1x}$ to $W_{Nx}$ and the current row $IN_{x1}$ to $IN_{xK}$ to the MAC circuit 120 to execute the MAC calculation. After step S550 is completed, the control circuit 140 may perform step S560.

When the contents of the current row $IN_{x1}$ to $IN_{xK}$ of the second matrix IN in the pre-fetch data are all 0 ("yes" is determined in step S530), the control circuit 140 may perform step S570. In step S570, the control circuit 140 may skip fetching the current column $W_{1x}$ to $W_{Nx}$ of the first matrix W from the storing unit 110. Such that, the control circuit 140 may configure the MAC circuit 120 not to perform the MAC calculation on the current column $W_{1x}$ to $W_{Nx}$ of the first matrix W and the current row $IN_{x1}$ to $IN_{xK}$ of the second matrix IN. After step S570 is completed, the control circuit 140 may perform step S560.

In step S560, the control circuit 140 may check that whether any row not being selected yet is present in the pre-fetch data of step S510. When a row that not being selected yet is present in the pre-fetch data of step S510 ("yes" is determined in step S560), the control circuit 140 may return to step S520, so as to select one row among the unselected one or plural rows in the pre-fetch data of step S510 to act as the current row $IN_{x1}$ to $IN_{xK}$.

When all rows in the pre-fetch data of step S510 are all selected ("no" is determined in step S560), the control circuit 140 may perform step S580. In step S580, the control circuit 140 may determine that whether any row not being fetched yet by the pre-fetch circuit 130 is present in the second matrix IN. When a row not being pre-fetched yet is present in the second matrix IN ("yes" is determined in step S580), the control circuit 140 may return to step S510, such that the pre-fetch circuit 130 pre-fetches one row or plural rows of the second matrix IN in the next batch from the storing unit 110 to act as the new pre-fetch data.

Table 2 is a calculation example of Formula 3 performed by the matrix calculation device 100 when the operation shown in FIG. 5 is performed. With reference to FIG. 1, FIG. 3, FIG. 5, Formula 3, and Table 2 together, during the period $T_1$ shown in Table 2, the pre-fetch circuit 130 may pre-fetch element values "0, 0, 0", "2, 2, 0", "0, 0, 0", and "0, 0, 0" of the first row $IN_{11}$ to $IN_{13}$ to a fourth row $IN_{41}$ to $IN_{43}$ of the second matrix IN from the storing unit 110 to act as the pre-fetch data (step S510) and provides the pre-fetch data to the control circuit 140. As such, the control circuit 140 may scan (check) the pre-fetch data to determine that whether any row whose contents are all 0 is present in the pre-fetch data (step S520 and step S530). In the example shown in Table 2 below, the control circuit 140 may set the first row $IN_{11}$ to $IN_{13}$ (the element values thereof are "0, 0, 0") of the second matrix IN pre-fetched during the period $T_1$ as the current row. Since the contents of the first row $IN_{11}$ to $IN_{13}$ are all 0, the control circuit 140 may skip fetching the current column $W_{11}$ to $W_{31}$ from the storing unit 110 (step S570), and that the MAC circuit 120 does not perform the MAC calculation on the current column $W_{11}$ to $W_{31}$ of the first matrix W and the current row $IN_{11}$ to $IN_{13}$ of the second matrix IN. Next, the control circuit 140 may set the second row $IN_{21}$ to $IN_{23}$ (the element values thereof are "2, 2, 0") of the second matrix IN pre-fetched during the period $T_1$ shown in Table 2 as the current row. Since the contents of the current row $IN_{21}$ to $IN_{23}$ are not all 0, the control circuit 140 may fetch the element values "12, 22, 32" corresponding to the current column $W_{12}$ to $W_{32}$ of the first matrix W from the storing unit 110 during the period $T_2$ shown in Table 2 (step S540) and then provides the current column $W_{12}$ to $W_{32}$ and the current row $IN_{21}$ to $IN_{23}$ to the MAC circuit 120 to perform the MAC calculation (step S550). Similarly, since element values of other rows $IN_{31}$ to $IN_{33}$ and $IN_{41}$ to $IN_{43}$ pre-fetched during the period $T_1$ shown in Table 2 are all "0, 0, 0", such that MAC calculation of the rows $IN_{31}$ to $IN_{33}$ and $IN_{41}$ to $IN_{43}$ is skipped.

TABLE 2

Another Calculation Example of Formula 3 Performed by Matrix Calculation Device 100

| Period | Pre-Fetching Data | Fetching $W_{1x}$ to $W_{Nx}$ |
| --- | --- | --- |
| $T_1$ | 0, 0, 0 | |
| | 2, 2, 0 | |
| | 0, 0, 0 | |
| | 0, 0, 0 | |
| $T_2$ | 0, 0, 0 | 12, 22, 32 |
| | 6, 6, 6 | |
| | 0, 0, 0 | |
| | 8, 8, 8 | |
| $T_3$ | | 16, 26, 36 |
| $T_4$ | | 18, 28, 38 |

The control circuit 140 may determine that in the rows of the second matrix IN pre-fetched during the period $T_1$ shown in Table 2, only 1 row (i.e., the second row $IN_{21}$ to $IN_{23}$ of the second matrix IN) has non 0 elements, and as such, the control circuit 140 may inform the pre-fetch circuit 130 to pre-fetch the pre-fetch data of the next batch during the period $T_2$ shown in Table 2. During the period $T_2$ shown in Table 2, the pre-fetch circuit 130 may pre-fetch element values "0, 0, 0", "6, 6, 6", "0, 0, 0", and "8, 8, 8" of the other 4 rows (that is, a fifth row $IN_{51}$ to $IN_{53}$, a sixth row $IN_{61}$ to $IN_{63}$, a seventh row $IN_{71}$ to $IN_{73}$, and an eighth row $IN_{81}$ to $IN_{83}$) of the second matrix IN from the storing unit 110 to act as the pre-fetch data (step S510) and provides the pre-fetch data to the control circuit 140. As such, the control circuit 140 may scan (check) the pre-fetch data pre-fetched during the period $T_2$ shown in Table 2 to determine that whether any row whose contents are all 0 is present in the pre-fetch data (step S520 and step S530).

In the example shown in Table 2 above, the control circuit 140 may set the six row $IN_{61}$ to $IN_{63}$ (the element values thereof are "6, 6, 6") of the second matrix IN pre-fetched during the period $T_2$ as the current row. Since the contents of the current row $IN_{61}$ to $IN_{63}$ are not all 0, the control circuit 140 may fetch the element values "16, 26, 36" corresponding to the current column $W_{16}$ to $W_{36}$ of the first matrix W from the storing unit 110 during a period T3 shown in Table 2 (step S540) and then provides the current column $W_{16}$ to $W_{36}$ and the current row $IN_{61}$ to $IN_{63}$ to the MAC circuit 120 to perform the MAC calculation (step S550). The control circuit 140 may determine that in the rows of the second matrix IN pre-fetched during the period $T_2$ shown in Table 2, more than 1 row (i.e., the sixth row $IN_{61}$ to $IN_{63}$ and the eighth row $IN_{81}$ to $IN_{83}$ of the second matrix IN) has non 0 elements, and as such, the control circuit 140 may inform the pre-fetch circuit 130 that there is no need to pre-fetch the pre-fetch data of the next batch during the period $T_3$ shown in Table 2.

Next, the control circuit 140 may set the eighth row $IN_{81}$ to $IN_{83}$ (the element values thereof are "8, 8, 8") of the second matrix IN pre-fetched during the period $T_2$ shown in Table 2 as the current row. Since the contents of the current row $IN_{81}$ to $IN_{83}$ are not all 0, the control circuit 140 may fetch the element values "18, 28, 38" corresponding to the current column $W_{18}$ to $W_{38}$ of the first matrix W from the storing unit 110 during a period T4 shown in Table 2 (step S540) and then provides the current column $W_{18}$ to $W_{38}$ and the current row $IN_{81}$ to $IN_{83}$ to the MAC circuit 120 to perform the MAC calculation (step S550). Since element values of other rows $IN_{51}$ to $IN_{53}$ and $IN_{71}$ to $IN_{73}$ pre-fetched during the period $T_2$ shown in Table 2 are all "0, 0, 0", such that MAC calculation of the rows $IN_{51}$ to $IN_{53}$ and $IN_{71}$ to $IN_{73}$ is skipped. During the period $T_3$ shown in Table 2, the control circuit 140 may determine that in the rows of the second matrix IN pre-fetched during the period $T_2$, only 1 row (i.e., the eighth row $IN_{81}$ to $IN_{83}$) has non 0 elements, but since a matrix end is reached (that is, all rows of the second matrix IN are pre-fetched), the control circuit 140 may inform the pre-fetch circuit 130 that there is not need to pre-fetch data during the period $T_4$.

Compared to the example shown in Table 1 in which eight periods $T_1$ to $T_8$ are required to complete the matrix multiplication calculation shown by Formula 3, through the matrix calculation device 100 applying the operation method provided in FIG. 5, only four periods $T_1$ to $T_4$ are required to complete the matrix multiplication calculation shown by Formula 3 in the example of Table 2. Therefore, calculation time may be effectively saved through the matrix calculation device 100 applying the operation method provided in FIG. 5. In addition, in the flow chart shown in FIG. 5, when all contents of the current row are all 0, fetching of the current column from the storing unit 110 may be skipped, such that the number of times of accessing the storing unit 110 may be reduced.

Another calculation example of the MAC circuit 120 shown in FIG. 3 is provided as follows. It is assumed that the MAC circuit 120 shown in FIG. 3 performs the matrix multiplication calculation shown by Formula 4 provided as follows. Formula 4 may be treated as another example of Formula 2 (the N value is 3, the M value is 8, and the K value is 3), such that Formula 4 may be deduced according to description related to Formula 2. Table 3 is a calculation example of Formula 4 performed by the matrix calculation device 100 without the operation shown in FIG. 4. With reference to FIG. 3, Formula 4, FIG. 1, and FIG. 3 together, the MAC circuit 120 shown in FIG. 3 receives (fetches) the element values "0, 0, 0" of the first column $W_{11}$ to $W_{N1}$ of the first matrix W and the element values "11, 12, 13" of the first row $IN_{11}$ to $IN_{1K}$ of the second matrix IN during a period (stage) $T_1$ shown in Table 3 to perform the MAC calculation and then stores the product values to the corresponding registers (to act as the MAC values). Next, during a period (stage) $T_2$ shown in Table 3, the MAC circuit 120 receives the element values "2, 2, 0" of the second column $W_{12}$ to $W_{N2}$ of the first matrix W and the element values "21, 22, 23" of the second row $IN_{21}$ to $IN_{2K}$ of the second matrix IN to perform the MAC calculation, adds the product values into the previous MAC values and obtains new MAC values, and then stores the new MAC values back into the corresponding registers. By analogy, calculation may be performed until completion of the period (stage) $T_8$ shown in Table 3.

$$\begin{bmatrix} 0 & 2 & 0 & 0 & 0 & 6 & 0 & 8 \\ 0 & 2 & 0 & 0 & 0 & 6 & 0 & 8 \\ 0 & 0 & 0 & 0 & 0 & 6 & 0 & 8 \end{bmatrix} \times \begin{bmatrix} 11 & 12 & 13 \\ 21 & 22 & 23 \\ 31 & 32 & 33 \\ 41 & 42 & 43 \\ 51 & 52 & 53 \\ 61 & 62 & 63 \\ 71 & 72 & 73 \\ 81 & 82 & 83 \end{bmatrix} = \begin{bmatrix} O_{11} & O_{12} & O_{13} \\ O_{21} & O_{22} & O_{23} \\ O_{31} & O_{32} & O_{33} \end{bmatrix} \quad \text{Formula 4}$$

TABLE 3

One Calculation Example of Formula 4 Performed by Matrix Calculation Device 100

| Period | Fetching $W_{1x}$ to $W_{Nx}$ | Pre-Fetching $IN_{x1}$ to $IN_{xK}$ |
|---|---|---|
| $T_1$ | 0, 0, 0 | 11, 12, 13 |
| $T_2$ | 2, 2, 0 | 21, 22, 23 |
| $T_3$ | 0, 0, 0 | 31, 32, 33 |
| $T_4$ | 0, 0, 0 | 41, 42, 43 |
| $T_5$ | 0, 0, 0 | 51, 52, 53 |
| $T_6$ | 6, 6, 6 | 61, 62, 63 |
| $T_7$ | 0, 0, 0 | 71, 72, 73 |
| $T_8$ | 8, 8, 8 | 81, 82, 83 |

From Table 3, it may be seen that the element values of the current column $W_{1x}$ to $W_{Nx}$ fetched by the MAC circuit 120 during the periods $T_1$, $T_3$, $T_4$, $T_5$, and $T_7$ are all 0, such that the product values of the MAC calculation performed by the MAC calculation circuit during the periods $T_1$, $T_3$, $T_4$, $T_5$, and $T_7$ are all 0. That is, the MAC calculation of this time is redundant. In other words, calculation performed by the MAC circuit 120 during the periods $T_1$, $T_3$, $T_4$, $T_5$, and $T_7$ shown in Table 3 is in vain.

Figure 6:
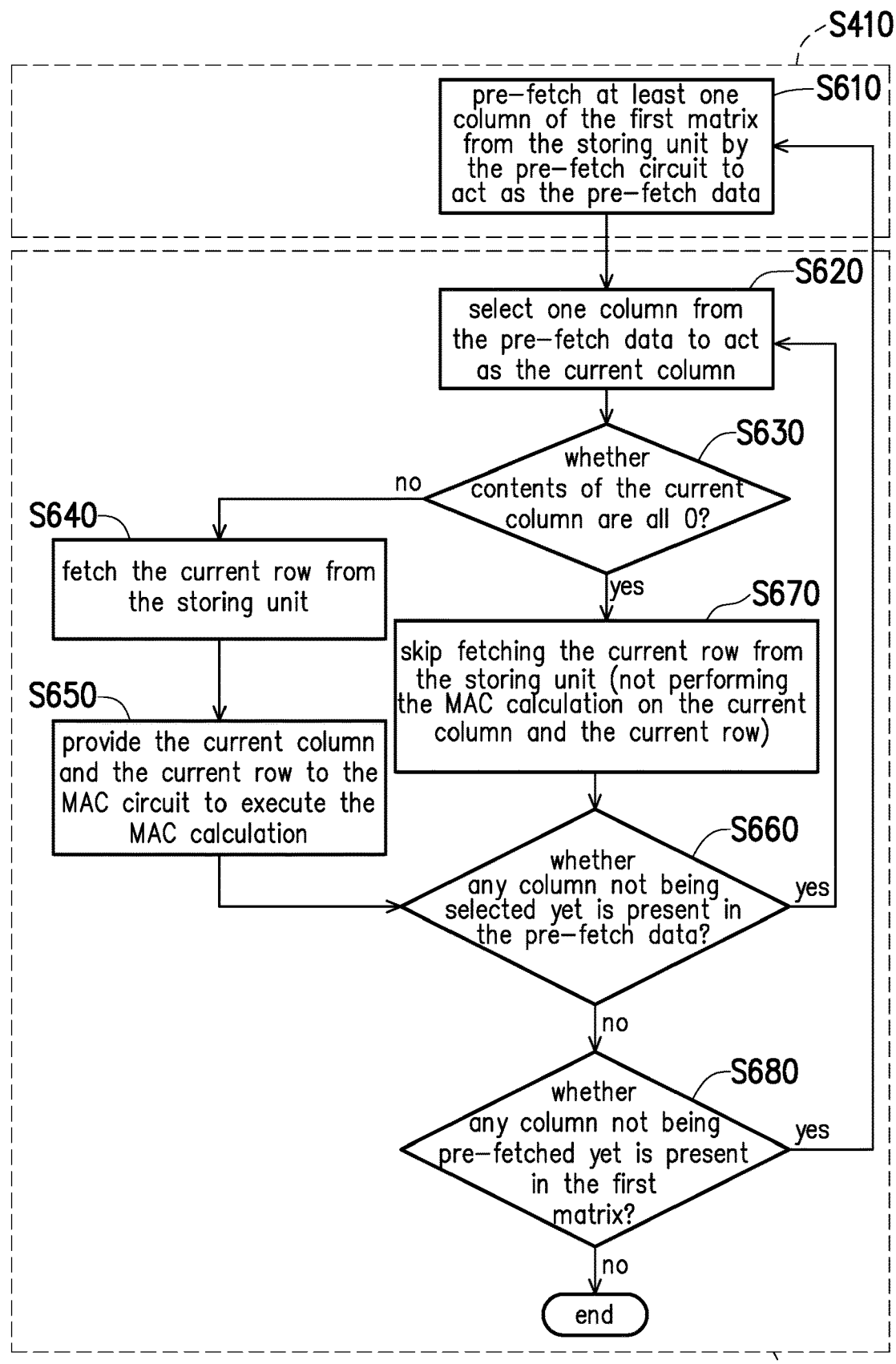
FIG. 6 is a schematic flow chart describing the steps shown in FIG. 4 according to another embodiment of the disclosure.

FIG. 6 is a schematic flow chart describing step S410 and step S430 shown in FIG. 4 according to another embodiment of the disclosure. Step S410 shown in FIG. 6 includes step S610, and step S430 shown in FIG. 6 includes steps S620, S630, S640, S650, S660, S670, and S680. In step S610, the pre-fetch circuit 130 may pre-fetch at least one column of the first matrix W from the storing unit 110 to act as pre-fetch data. The number of columns to be pre-fetched by the pre-fetch circuit 130 in one batch from the storing unit 110 may be decided according to design needs. In an extreme example, the pre-fetch circuit 130 pre-fetches one column of the first matrix W in one batch from the storing unit 110 to act as the pre-fetch data. In another extreme example, the pre-fetch circuit 130 pre-fetches all columns of the first matrix W in one batch from the storing unit 110 to act as the pre-fetch data.

In step S620, the control circuit 140 may select one column to act as the current column $W_{1x}$ to $W_{Nx}$ from the pre-fetch data of step S610. In a case that the pre-fetch data includes only one single column, step S620 and step S660 may be skipped according to design needs. The pre-fetch data of step S610 may include the current column $W_{1x}$ to $W_{Nx}$ of the first matrix W, and as such, in step S630, the control circuit 140 may check the pre-fetch data, so as to determine whether the contents (all element values) of the current column $W_{1x}$ to $W_{Nx}$ of the first matrix W are all 0.

When the contents of the current column $W_{1x}$ to $W_{Nx}$ of the first matrix W in the pre-fetch data are not all 0 ("no" is determined in step S630), the control circuit 140 may perform step S640. In step S640, the control circuit 140 may fetch the current row $IN_{x1}$ to $IN_{xK}$ of the second matrix IN from the storing unit 110. In step S650, the control circuit 140 may provide the current column $W_{1x}$ to $W_{Nx}$ and the current row $IN_{x1}$ to $IN_{xK}$ to the MAC circuit 120 to execute the MAC calculation. After step S650 is completed, the control circuit 140 may perform step S660.

In step S660, the control circuit 140 may check that whether any column not being selected yet is present in the pre-fetch data of step S610. When a column not being selected yet is present in the pre-fetch data of step S610 ("yes" is determined in step S660), the control circuit 140 may return to step S620, so as to select one column among the unselected one or plural columns in the pre-fetch data of step S610 to act as the current column $W_{1x}$ to $W_{Nx}$.

When the contents of the current column $W_{1x}$ to $W_{Nx}$ of the first matrix W in the pre-fetch data are all 0 ("yes" is determined in step S630), the control circuit 140 may perform step S670. In step S670, the control circuit 140 may skip fetching the current row $IN_{x1}$ to $IN_{xK}$ of the second matrix IN from the storing unit 110. Such that, the control circuit 140 may configure the MAC circuit 120 not to perform the MAC calculation on the current column $W_{1x}$ to $W_{Nx}$ of the first matrix W and the current row $IN_{x1}$ to $IN_{xK}$ of the second matrix IN. After step S670 is completed, the control circuit 140 may perform step S660.

When all columns in the pre-fetch data of step S610 are all selected ("no" is determined in step S660), the control circuit 140 may perform step S680. In step S680, the control circuit 140 may determine that whether any column not being fetched yet by the pre-fetch circuit 130 is present in the first matrix W. When a column not being pre-fetched yet is present in the first matrix W ("yes" is determined in step S680), the control circuit 140 may return to step S610, such that the pre-fetch circuit 130 pre-fetches one column or plural columns of the first matrix W in the next batch from the storing unit 110 to act as the new pre-fetch data.

Table 4 is a calculation example of Formula 4 performed by the matrix calculation device 100 when the operation shown in FIG. 6 is performed. With reference to FIG. 1, FIG. 3, FIG. 6, Formula 4, and Table 4 together, during the period $T_1$ shown in Table 4, the pre-fetch circuit 130 may pre-fetch element values "0, 0, 0", "2, 2, 0", "0, 0, 0", and "0, 0, 0" of the first column $W_{11}$ to $W_{31}$ to a fourth column $W_{14}$ to $W_{34}$ of the first matrix W from the storing unit 110 to act as the pre-fetch data (step S610) and provides the pre-fetch data to the control circuit 140. As such, the control circuit 140 may scan (check) the pre-fetch data to determine that whether any column whose contents are all 0 is present in the pre-fetch data (step S620 and step S630). In the example shown in Table 4 below, the control circuit 140 may set the first column $W_{11}$ to $W_{31}$ (the element values thereof are "0, 0, 0") of the first matrix W pre-fetched during the period $T_1$ as the current column. Since the contents of the first column $W_{11}$ to $W_{31}$ are all 0, the control circuit 140 may skip fetching the current row $IN_{11}$ to $IN_{13}$ from the storing unit 110 (step S670), and that the MAC circuit 120 does not perform the MAC calculation on the current column $W_{11}$ to $W_{31}$ of the first matrix W and the current row $IN_{11}$ to $IN_{13}$ of the second matrix IN. Next, the control circuit 140 may set the second column $W_{12}$ to $W_{32}$ (the element values thereof are "2, 2, 0") of the first matrix W pre-fetched during the period $T_1$ shown in Table 4 as the current column. Since the contents of the current row $W_{12}$ to $W_{32}$ are not all 0, the control circuit 140 may fetch the element values "21, 22, 23" corresponding to the current row $IN_{21}$ to $IN_{23}$ of the second matrix IN from the storing unit 110 during the period $T_2$ shown in Table 4 (step S640) and then provides the current column $W_{12}$ to $W_{32}$ and the current row $IN_{21}$ to $IN_{23}$ to the MAC circuit 120 to perform the MAC calculation (step S650). Similarly, since element values of other columns $W_{13}$ to $W_{33}$ and $W_{14}$ to $W_{34}$ pre-fetched during the period $T_1$ shown in Table 4 are all "0, 0, 0", such that MAC calculation of the columns $W_{13}$ to $W_{33}$ and $W_{14}$ to $W_{34}$ is skipped.

TABLE 4

Another Calculation Example of Formula 4 Performed by Matrix Calculation Device 100

| Period | Pre-Fetching Data | Fetching $IN_{x1}$ to $IN_{xK}$ |
|---|---|---|
| $T_1$ | 0, 0, 0 | |
|  | 2, 2, 0 | |
|  | 0, 0, 0 | |
|  | 0, 0, 0 | |
| $T_2$ | 0, 0, 0 | 21, 22, 23 |
|  | 6, 6, 6 | |
|  | 0, 0, 0 | |
|  | 8, 8, 8 | |
| $T_3$ |  | 61, 62, 63 |
| $T_4$ |  | 81, 82, 83 |

The control circuit 140 may determine that in the columns of the first matrix W pre-fetched during the period $T_1$ shown in Table 4, only 1 column (i.e., the second column $W_{12}$ to $W_{32}$ of the first matrix W) has non 0 elements, and as such, the control circuit 140 may inform the pre-fetch circuit 130 to pre-fetch the pre-fetch data of the next batch during the period $T_2$ shown in Table 4. During the period $T_2$ shown in Table 4, the pre-fetch circuit 130 may pre-fetch element values "0, 0, 0", "6, 6, 6", "0, 0, 0", and "8, 8, 8" of the other 4 columns (that is, a fifth column $W_{15}$ to $W_{35}$, a sixth column $W_{16}$ to $W_{36}$, a seventh column $W_{17}$ to $W_{37}$, and an eighth column $W_{18}$ to $W_{38}$) of the first matrix W from the storing unit 110 to act as the pre-fetch data (step S610) and provides the pre-fetch data to the control circuit 140. As such, the control circuit 140 may scan (check) the pre-fetch data pre-fetched during the period $T_2$ shown in Table 4 to determine that whether any row whose contents are all 0 is present in the pre-fetch data (step S620 and step S630).

In the example shown in Table 4, the control circuit 140 may set the sixth column $W_{16}$ to $W_{36}$ (the element values thereof are "6, 6, 6") of the first matrix W pre-fetched during the period $T_2$ as the current column. Since the contents of the current column $W_{16}$ to $W_{36}$ are not all 0, the control circuit 140 may fetch the element values "61, 62, 63" corresponding to the current row $IN_{61}$ to $IN_{63}$ of the second matrix IN from the storing unit 110 during the period $T_3$ shown in Table 4 (step S640) and then provides the current column $W_{16}$ to $W_{36}$ and the current row $IN_{61}$ to $IN_{63}$ to the MAC circuit 120 to perform the MAC calculation (step S650). The control circuit 140 may determine that in the columns of the first matrix W pre-fetched during the period $T_2$ shown in Table 4, more than 1 column (i.e., the sixth column $W_{16}$ to $W_{36}$ and the eighth column $W_{18}$ to $W_{38}$ of the first matrix W) has non 0 elements, and as such, the control circuit 140 may inform the pre-fetch circuit 130 that there is no need to pre-fetch the pre-fetch data of the next batch during the period $T_3$ shown in Table 4.

Next, the control circuit 140 may set the eighth column $W_{18}$ to $W_{38}$ (the element values thereof are "8, 8, 8") of the first matrix W pre-fetched during the period $T_2$ shown in Table 4 as the current column. Since the contents of the current column $W_{18}$ to $W_{38}$ are not all 0, the control circuit 140 may fetch the element values "81, 82, 83" corresponding to the current row $IN_{81}$ to $IN_{83}$ of the second matrix IN from the storing unit 110 during the period $T_4$ shown in Table 4 (step S640) and then provides the current column $W_{18}$ to $W_{38}$ and the current row $IN_{81}$ to $IN_{83}$ to the MAC circuit 120 to perform the MAC calculation (step S650). Since element values of other columns $W_{15}$ to $W_{35}$ and $W_{17}$ to $W_{37}$ pre-fetched during the period $T_2$ shown in Table 4 are all "0, 0, 0", such that MAC calculation of the columns $W_{15}$ to $W_{35}$ and $W_{17}$ to $W_{37}$ is skipped. During the period T3 shown in Table 4, the control circuit 140 may determine that in the columns of the first matrix W pre-fetched during the period $T_2$, only 1 column (i.e., the eighth column $W_{18}$ to $W_{38}$) has non 0 elements, but since the matrix end is reached (that is, all columns of the first matrix W are pre-fetched), the control circuit 140 may inform the pre-fetch circuit 130 that there is no need to pre-fetch data during the period $T_4$.

Compared to the example shown in Table 3 in which eight periods $T_1$ to $T_8$ are required to complete the matrix multiplication calculation shown by Formula 4, through the matrix calculation device 100 applying the operation method provided in FIG. 6, only four periods $T_1$ to $T_4$ are required to complete the matrix multiplication calculation shown by Formula 4 in the example of Table 4. Therefore, calculation time may be effectively saved through the matrix calculation device 100 applying the operation method provided in FIG. 6. In addition, in the flow chart shown in FIG. 6, when all contents of the current column are all 0, fetching of the current row from the storing unit 110 may be skipped, such that the number of times of accessing the storing unit 110 may be reduced.

Still another calculation example of the MAC circuit 120 shown in FIG. 3 is provided as follows. It is assumed that the MAC circuit 120 shown in FIG. 3 performs the matrix multiplication calculation shown by Formula 5 provided as follows. Formula 5 may be treated as still another example of Formula 2 (the N value is 3, the M value is 8, and the K value is 3), such that Formula 5 may be deduced according to description related to Formula 2. Table 5 is a calculation example of Formula 5 performed by the matrix calculation device 100 without the operation shown in FIG. 4. With reference to Table 5, Formula 5, FIG. 1, and FIG. 3 together, the MAC circuit 120 shown in FIG. 3 receives (fetches) the element values "1, 1, 1" of the first column $W_{11}$ to $W_{N1}$ of the first matrix W and the element values "0, 0, 0" of the first row $IN_{11}$ to $IN_{1K}$ of the second matrix IN during the period (stage) $T_1$ shown in Table 5 to perform the MAC calculation and then stores the product values to the corresponding registers (to act as the MAC values). Next, during the period (stage) $T_2$ shown in Table 5, the MAC circuit 120 receives the element values "0, 0, 0" of the second column $W_{12}$ to $W_{N2}$ of the first matrix W and the element values "2, 2, 2" of the second row $IN_{21}$ to $IN_{2K}$ of the second matrix IN to perform the MAC calculation, adds the product values into the previous MAC values and obtains new MAC values, and then stores the new MAC values back into the corresponding registers. By analogy, calculation may be performed until completion of the period (stage) $T_8$ shown in Table 5.

$$\begin{bmatrix} 1 & 0 & 3 & 0 & 15 & 6 & 0 & 8 \\ 1 & 0 & 3 & 0 & 25 & 6 & 0 & 8 \\ 1 & 0 & 3 & 0 & 35 & 6 & 0 & 8 \end{bmatrix} \times \begin{bmatrix} 0 & 0 & 0 \\ 2 & 2 & 2 \\ 0 & 0 & 0 \\ 0 & 0 & 0 \\ 51 & 52 & 53 \\ 0 & 0 & 0 \\ 7 & 7 & 7 \\ 0 & 0 & 0 \end{bmatrix} = \begin{bmatrix} O_{11} & O_{12} & O_{13} \\ O_{21} & O_{22} & O_{23} \\ O_{31} & O_{32} & O_{33} \end{bmatrix}$$

Formula 5

TABLE 5

One Calculation Example of Formula 5 Performed by Matrix Calculation Device 100

| Period | Fetching $W_{1x}$ to $W_{Nx}$ | Fetching $IN_{x1}$ to $IN_{xK}$ |
|---|---|---|
| $T_1$ | 1, 1, 1 | 0, 0, 0 |
| $T_2$ | 0, 0, 0 | 2, 2, 2 |
| $T_3$ | 3, 3, 3 | 0, 0, 0 |
| $T_4$ | 0, 0, 0 | 0, 0, 0 |
| $T_5$ | 15, 25, 35 | 51, 52, 53 |
| $T_6$ | 6, 6, 6 | 0, 0, 0 |
| $T_7$ | 0, 0, 0 | 7, 7, 7 |
| $T_8$ | 8, 8, 8 | 0, 0, 0 |

From Table 5, it may be seen that the element values of the current column $W_{1x}$ to $W_{Nx}$ fetched by the MAC circuit 120 during the periods $T_2$, $T_4$, and $T_7$ are all 0 and element values of the current row $IN_{x1}$ to $IN_xK$ fetched during the periods $T_1$, $T_3$, $T_4$, $T_6$, and $T_8$ are all 0, such that the product values of the MAC calculation performed by the MAC calculation circuit during the periods $T_1$, $T_2$, $T_3$, $T_4$, $T_6$, $T_7$, and $T_8$ are all 0. That is, the MAC calculation of this time is redundant. In other words, calculation performed by the MAC circuit 120 during the periods $T_1$, $T_2$, $T_3$, $T_4$, $T_6$, $T_7$, and $T_8$ shown in Table 1 is in vain.

Figure 7:
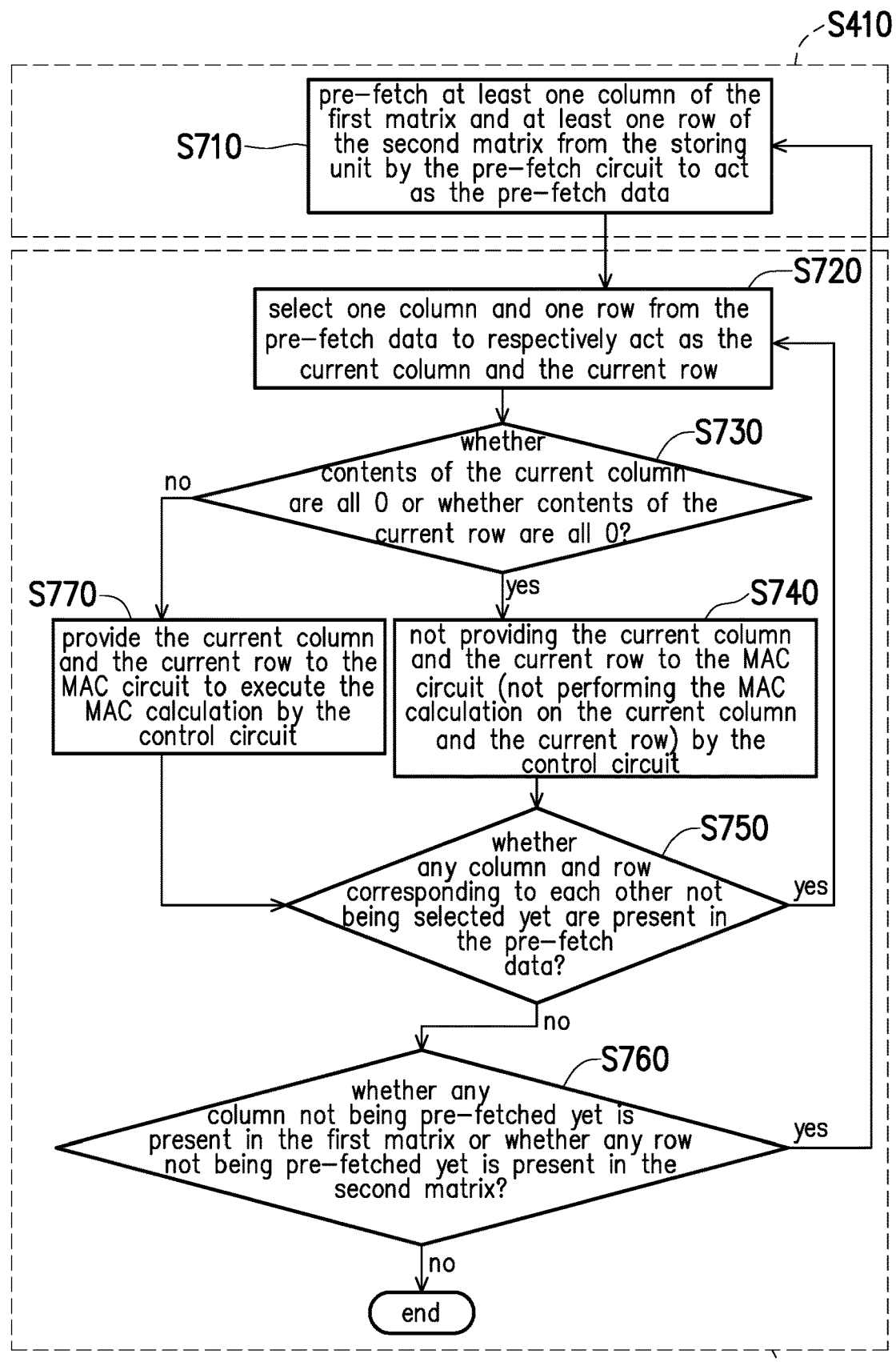
FIG. 7 is a schematic flow chart describing the steps shown in FIG. 4 according to still another embodiment of the disclosure.

FIG. 7 is a schematic flow chart describing step S410 and step S430 shown in FIG. 4 according to still another embodiment of the disclosure. Step S410 shown in FIG. 7 includes step S710, and step S430 shown in FIG. 7 includes steps S720, S730, S740, S750, S760, and S770. In step S710, the pre-fetch circuit 130 may pre-fetch at least one column of the first matrix W and at least one row of the second matrix IN from the storing unit 110 to act as pre-fetch data. The number of columns and the number of rows to be pre-fetched by the pre-fetch circuit 130 in one batch from the storing unit 110 may be decided according to design needs. In an extreme example, the pre-fetch circuit 130 pre-fetches one column of the first matrix W and one row of the second matrix IN in one batch from the storing unit 110 to act as the pre-fetch data. In another extreme example, the pre-fetch circuit 130 pre-fetches all columns of the first matrix W and all rows of the second matrix IN in one batch from the storing unit 110 to act as the pre-fetch data.

In step S720, the control circuit 140 may select one column and one row corresponding to each other to respectively act as the current column $W_{1x}$ to $W_{Nx}$ and the current row $IN_{x1}$ to $IN_{xK}$ from the pre-fetch data of step S710. In a case that the pre-fetch data includes only one single row and one single column, step S720 and step S750 may be skipped according to design needs. The pre-fetch data of step S710 may include the current column $W_{1x}$ to $W_{Nx}$ of the first matrix W and the current row $IN_{x1}$ to $IN_{xK}$ of the second matrix IN, and as such, in step S730, the control circuit 140 may check the pre-fetch data, so as to determine whether the contents of the current column $W_{1x}$ to $W_{Nx}$ of the first matrix W are all 0 or contents of the current row $IN_{x1}$ to $IN_{xK}$ of the second matrix IN are all 0.

When the contents of the current column $W_{1x}$ to $W_{Nx}$ of the first matrix W in the pre-fetch data are all 0 or the contents of the current row $IN_{x1}$ to $IN_{xK}$ in the second matrix IN in the pre-fetch data are all 0 ("yes" is determined in step S730), the control circuit 140 may perform step S740. In step S740, the control circuit 140 may not provide the current column $W_{1x}$ to $W_{Nx}$ and the current row $IN_{x1}$ to $IN_{xK}$ to the MAC circuit 120, such that the MAC circuit 120 does not perform the MAC calculation on the current column $W_{1x}$ to $W_{Nx}$ and the current row $IN_{x1}$ to $IN_{xK}$. After step S740 is completed, the control circuit 140 may perform step S750.

In step S750, the control circuit 140 may check that whether any column and row corresponding to each other and not being selected yet are present in the pre-fetch data of step S710. When a column and a row corresponding to each other and not being selected yet are present in the pre-fetch data of step S710 ("yes" is determined in step S750), the control circuit 140 may return to step S720, so as to select one column and one row corresponding to each other among the unselected columns and rows in the pre-fetch data of step S710 to respectively act as the current column $W_{1x}$ to $W_{Nx}$ and the current row $IN_{x1}$ to $IN_{xK}$.

When all columns and rows corresponding to each other in the pre-fetch data of step S710 are all selected ("no" is determined in step S750), the control circuit 140 may perform step S760. In step S760, the control circuit 140 may determine that whether any column not being fetched yet is present in the first matrix W or any row not being fetched yet is present in the second matrix IN. When a column not being pre-fetched yet is present in the first matrix W or a row not being pre-fetched yet is present in the second matrix IN ("yes" is determined in step S760), the control circuit 140 may return to step S710, such that the pre-fetch circuit 130 pre-fetches one column or plural columns of the first matrix W and one row or plural rows of the second matrix IN in the next batch from the storing unit 110 to act as the new pre-fetch data.

In step S730, when the contents of the current column $W_{1x}$ to $W_{Nx}$ of the first matrix W in the pre-fetch data are not all 0 and the contents of the current row $IN_{x1}$ to $IN_{xK}$ of the second matrix IN are not all 0 ("no" is determined in step S730), the control circuit 140 may perform step S770. In step S770, the control circuit 140 may provide the current column $W_{1x}$ to $W_{Nx}$ and the current row $IN_{x1}$ to $IN_{xK}$ to the MAC circuit 120 to execute the MAC calculation. After step S770 is completed, the control circuit 140 may perform step S750.

Table 6 is a calculation example of Formula 5 performed by the matrix calculation device 100 when the operation shown in FIG. 7 is performed. With reference to FIG. 1, FIG. 3, FIG. 7, Formula 5, and Table 6 together, during the period $T_1$ shown in Table 6, the pre-fetch circuit 130 may pre-fetch the element values "1, 1, 1", "0, 0, 0", "3, 3, 3", and "0, 0, 0" of the first column $W_{11}$ to $W_{31}$ to the fourth column $W_{14}$ to $W_{34}$ of the first matrix W and the element values "0, 0, 0", "2, 2, 2", "0, 0, 0", and "0, 0, 0" of the first row $IN_{11}$ to $IN_{13}$ to the fourth row $IN_{41}$ to $IN_{43}$ of the second matrix IN from the storing unit 110 to act as the pre-fetch data (step S710) and provides the pre-fetch data to the control circuit 140. As such, the control circuit 140 may scan (check) the pre-fetch data to determine that whether any row or any column whose contents are all 0 is present in the pre-fetch data (step S720 and step S730). In the example shown in Table 6 below, the control circuit 140 may set the first column $W_{11}$ to $W_{31}$ (the element values thereof are "1, 1, 1") pre-fetched during the period $T_1$ as the current column and the first row $IN_{11}$ to $IN_{13}$ (the element values thereof are "0, 0, 0") of the second matrix IN as the current row. Since the contents of the first row $IN_{11}$ to $IN_{13}$ are all 0 ("yes" is determined in step S730), the control circuit 140 may not provide the current column and the current row to the MAC circuit 120, such that the MAC circuit 120 does not perform the MAC calculation on the current column $W_{11}$ to $W_{31}$ and the current row $IN_{11}$ to $IN_{13}$ (step S740). Next, the control circuit 140 may set the second column $W_{12}$ to $W_{32}$ (the element values thereof are "0, 0, 0") of the first matrix W pre-fetched during the period $T_1$ shown in Table 6 as the current column and the second row $IN_{21}$ to $IN_{23}$ (the element values thereof are "2, 2, 2") of the second matrix IN as the current row. Since the contents of the current column $W_{12}$ to $W_{32}$ are all 0 ("yes" is determined in step S730), the control circuit 140 may configure the MAC circuit 120 not to perform the MAC calculation on the current column $W_{12}$ to $W_{32}$ and the current row $IN_{21}$ to $IN_{23}$ (step S740). Similarly, among other rows and columns pre-fetched during the period $T_1$ shown in Table 6, since the element values of the row $IN_{31}$ to $IN_{33}$ are "0, 0, 0", the MAC calculation on the column $W_{13}$ to $W_{33}$ and the row $IN_{31}$ to $IN_{33}$ is skipped (step S740). Similarly, since the element values of the column $W_{14}$ to $W_{34}$ are "0, 0, 0" and the element values of the row $IN_{41}$ to $IN_{43}$ are "0, 0, 0", the MAC calculation on the column $W_{14}$ to $W_{34}$ and the row $IN_{41}$ to $IN_{43}$ is skipped (step S740).

TABLE 6

Another Calculation Example of Formula 5 Performed by Matrix Calculation Device 100

| Period | Pre-Fetch Data (First Matrix W) | Pre-Fetch Data (Second Matrix IN) |
|---|---|---|
| $T_1$ | 1, 1, 1 | 0, 0, 0 |
|  | 0, 0, 0 | 2, 2, 2 |
|  | 3, 3, 3 | 0, 0, 0 |
|  | 0, 0, 0 | 0, 0, 0 |
| $T_2$ | 15, 25, 35 | 51, 52, 52 |
|  | 6, 6, 6 | 0, 0, 0 |
|  | 0, 0, 0 | 7, 7, 7 |
|  | 8, 8, 8 | 0, 0, 0 |

The control circuit 140 may determine that in the columns of the first matrix W and the rows of the second matrix IN pre-fetched during the period $T_1$ shown in Table 6, no group of a corresponding column and row has non 0 elements, and as such, the control circuit 140 may inform the pre-fetch circuit 130 to pre-fetch the pre-fetch data of the next batch during the period $T_2$ shown in Table 6. During the period $T_2$ shown in Table 6, the pre-fetch circuit 130 may pre-fetch the element values "15, 25, 36", "6, 6, 6", "0, 0, 0", and "8, 8, 8" of the other 4 columns (that is, the fifth column $W_{15}$ to $W_{35}$, the sixth column $W_{16}$ to $W_{36}$, the seventh column $W_{17}$ to $W_{37}$, and the eighth column $W_{18}$ to $W_{38}$) of the first matrix M and the element values "51, 52, 53", "0, 0, 0", "7, 7, 7", and "0, 0, 0" of the other four rows (that is, the fifth row $IN_{81}$ to $IN_{53}$, the sixth row $IN_{61}$ to $IN_{63}$, the seventh row $IN_{71}$ to $IN_{73}$, and the eighth row $IN_{81}$ to $IN_{83}$) of the second matrix IN from the storing unit 110 to act as the pre-fetch data (step S710) and provides the pre-fetch data to the control circuit 140. As such, the control circuit 140 may scan (check) the pre-fetch data pre-fetched during the period $T_2$ shown in Table 6 to determine that whether any group of a corresponding column and row whose contents are all 0 is present in the pre-fetch data (step S720 and step S730).

In the example shown in Table 6, the control circuit 140 may set the fifth column $W_{15}$ to $W_{35}$ (the element values thereof are "15, 25, 35") of the first matrix W pre-fetched during the period $T_2$ as the current column and the fifth row $IN_{51}$ to $IN_{53}$ (the element values thereof are "51, 52, 53") of the second matrix IN as the current row. Since the contents of the current column $W_{15}$ to $W_{35}$ are not all 0 and the contents of the current row $IN_{81}$ to $IN_{53}$ are not all 0 ("no" is determined in step S730), the control circuit 140 may provide the current column $W_{15}$ to $W_{35}$ and the current row $IN_{81}$ to $IN_{53}$ to the MAC circuit 120 to perform the MAC calculation (step S770). The control circuit 140 may determine that in the columns of the first matrix W and the rows of the second matrix IN pre-fetched during the period $T_2$ shown in Table 6, only contents of one group of a corresponding column and row (i.e., the fifth column $W_{15}$ to $W_{35}$ of the first matrix W and the fifth row $IN_{81}$ to $IN_{53}$ of the second matrix IN) are not all 0. Nevertheless, since the matrix end is reached, the control circuit 140 may inform the pre-fetch circuit 130 that there is no need to pre-fetch the pre-fetch data of the next batch.

Compared to the example shown in Table 5 in which eight periods $T_1$ to $T_8$ are required to complete the matrix multiplication calculation shown by Formula 5, through the matrix calculation device 100 applying the operation method provided in FIG. 7, only two periods $T_1$ to $T_2$ are required to complete the matrix multiplication calculation shown by Formula 5 in the example of Table 6. Therefore, calculation time may be effectively saved through the matrix calculation device 100 applying the operation method provided in FIG. 7.

Figure 8:
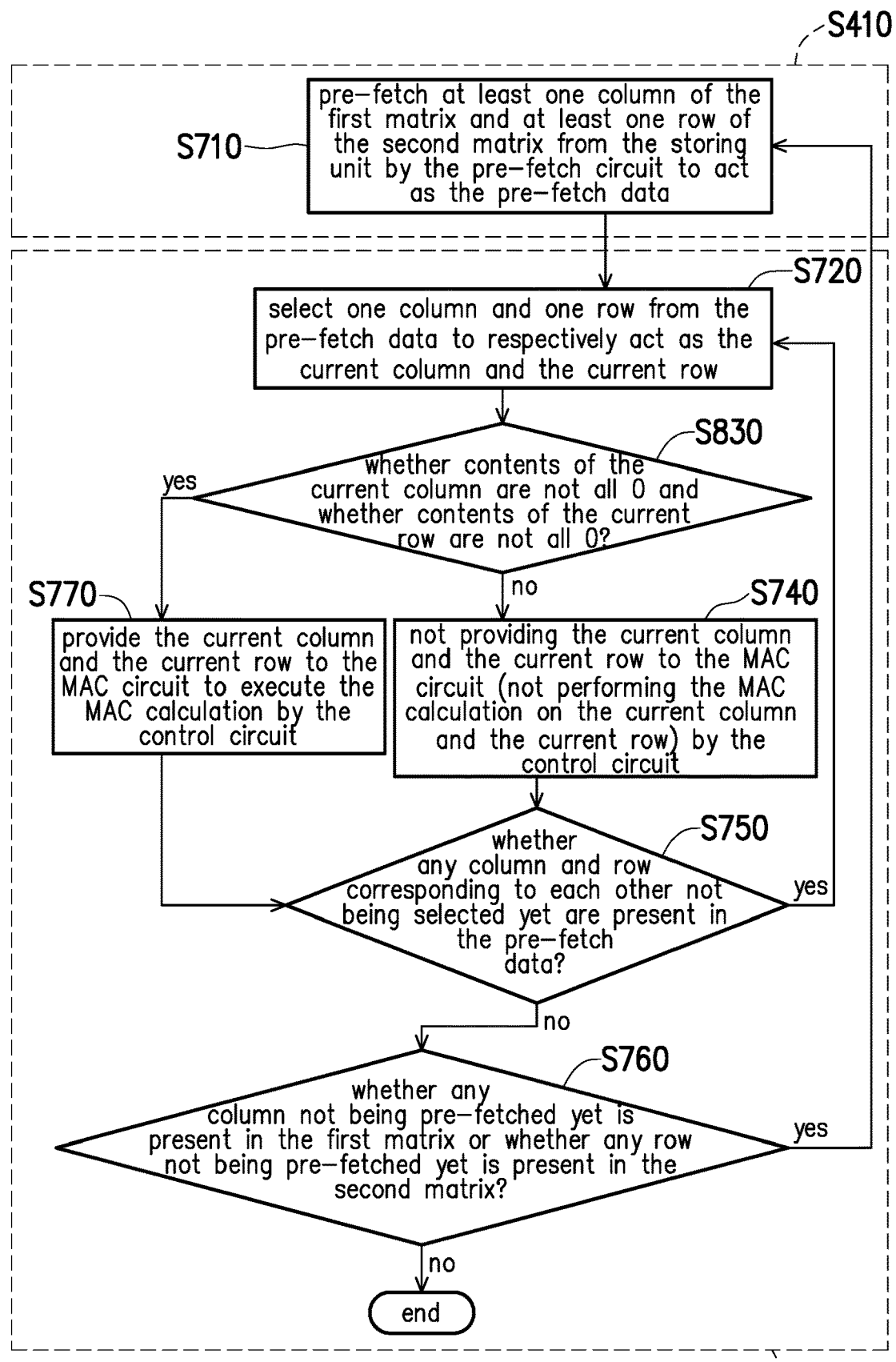
FIG. 8 is a schematic flow chart describing the steps shown in FIG. 4 according to yet another embodiment of the disclosure.

FIG. 8 is a schematic flow chart describing step S410 and step S430 shown in FIG. 4 according to yet another embodiment of the disclosure. Step S410 shown in FIG. 8 includes step S710, and step S430 shown in FIG. 8 includes steps S720, S830, S740, S750, S760, and S770. Related description of step S710, S720, S740, S750, S760, and S770 shown in FIG. 8 may be found with reference to step S710, S720, S740, S750, S760, and S770 shown in FIG. 7 thus is not provided herein. The difference between FIG. 8 and FIG. 7 is that step S730 shown in step S730 may be amended into step S830 shown in FIG. 8. In step S830, the control circuit 140 checks the pre-fetch data, so as to determine that whether the contents of the current column $W_{1x}$ to $W_{Nx}$ of the first matrix W are not all 0 and the contents of the current row $IN_{x1}$ to $IN_{xK}$ of the second matrix IN are not all 0. When the contents of the current column $W_{1x}$ to $W_{Nx}$ of the first matrix W in the pre-fetch data are not all 0 and the contents of the current row $IN_{x1}$ to $IN_{xK}$ in the second matrix IN in the pre-fetch data are not all 0 ("yes" is determined in step S830), the control circuit 140 may perform step S770. When the contents of the current column $W_{1x}$ to $W_{Nx}$ of the first matrix W in the pre-fetch data are all 0 or the contents of the current row $IN_{x1}$ to $IN_{xK}$ in the second matrix IN in the pre-fetch data are all 0 ("no" is determined in step S830), the control circuit 140 may perform step S740.

In view of the foregoing, in the matrix calculation device and the operation method thereof provided by the embodiments, the first matrix and/or the second matrix may be pre-fetched to obtain the pre-fetch data. According to the pre-fetch data, the matrix calculation device may decide whether to perform the MAC calculation on the current column of the first matrix and the current row of the second matrix through the MAC circuit. In this way, unnecessary MAC calculation may be reduced. For instance, the matrix calculation device may determine whether the contents of the current column (and/or the contents of the current row) are all 0 according to the pre-fetch data, so as to decide whether to skip the MAC calculation performed on the current column and the current row. When the contents of the current column and/or the current row are all 0, the matrix calculation device may not process the MAC calculation performed on the current column and the current row, and performance of the matrix calculation device may therefore be effectively enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A matrix calculation device, configured to perform a matrix multiplication of a first matrix multiplying a second matrix, the matrix calculation device comprising:
   a storing unit, adapted to store the first matrix and the second matrix;
   a multiply accumulate circuit, configured to execute multiply accumulate calculation;
   a pre-fetch circuit, coupled to the storing unit, wherein the pre-fetch circuit pre-fetches at least one column of the first matrix from the storing unit to act as pre-fetch data, the pre-fetch circuit pre-fetches at least one row of the second matrix from the storing unit to act as the pre-fetch data, or the pre-fetch circuit pre-fetches at least one column of the first matrix and at least one row of the second matrix from the storing unit to act as the pre-fetch data; and
   a control circuit, coupled to the storing unit, the multiply accumulate circuit, and the pre-fetch circuit, wherein the control circuit determines whether contents of a current column of the first matrix are all 0 according to the pre-fetch data, so as to decide whether to skip the multiply accumulate calculation performed on the current column and the current row, or
   the control circuit determines whether contents of a current row of the second matrix are all 0 according to the pre-fetch data, so as to decide whether to skip the multiply accumulate calculation performed on the current column and the current row.

2. The matrix calculation device according to claim 1, wherein in the case that the pre-fetch circuit pre-fetches at least one column of the first matrix from the storing unit to act as the pre-fetch data, when the contents of the current column in the pre-fetch data are all 0, the control circuit skips fetching the current row from the storing unit, such that the multiply accumulate circuit does not perform the multiply accumulate calculation on the current column of the first matrix and the current row of the second matrix.

3. The matrix calculation device according to claim 1, wherein in the case that the pre-fetch circuit pre-fetches at least one column of the first matrix from the storing unit to act as the pre-fetch data, when the contents of the current column in the pre-fetch data are not all 0, the control circuit fetches the current row from the storing unit, and the control circuit provides the current column and the current row to the multiply accumulate circuit to execute the multiply accumulate calculation.

4. The matrix calculation device according to claim 1, wherein in the case that the pre-fetch circuit pre-fetches at least one row of the second matrix from the storing unit to act as the pre-fetch data, when the contents of the current row in the pre-fetch data are all 0, the control circuit skips fetching the current column from the storing unit, such that the multiply accumulate circuit does not perform the multiply accumulate calculation on the current column of the first matrix and the current row of the second matrix.

5. The matrix calculation device according to claim 1, wherein in the case that the pre-fetch circuit pre-fetches at least one row of the second matrix from the storing unit to act as the pre-fetch data, when the contents of the current row in the pre-fetch data are not all 0, the control circuit fetches the current column from the storing unit, and the control circuit provides the current column and the current row to the multiply accumulate circuit to execute the multiply accumulate calculation.

6. The matrix calculation device according to claim 1, wherein in the case that the pre-fetch circuit pre-fetches at least one column of the first matrix and at least one row of the second matrix from the storing unit to act as the pre-fetch data, when the contents of the current column in the pre-fetch data are all 0 or when the contents of the current row in the pre-fetch data are all 0, the control circuit does not provide the current column and the current row to the multiply accumulate circuit, such that the multiply accumulate circuit does not perform the multiply accumulate calculation on the current column of the first matrix and the current row of the second matrix.

7. The matrix calculation device according to claim 1, wherein in the case that the pre-fetch circuit pre-fetches at least one column of the first matrix and at least one row of the second matrix from the storing unit to act as the pre-fetch data, when the contents of the current column in the pre-fetch data are not all 0 and when the contents of the current row in the pre-fetch data are not all 0, the control circuit provides the current column and the current row to the multiply accumulate circuit to execute the multiply accumulate calculation.

8. The matrix calculation device according to claim 1, wherein when the control circuit decides to perform the multiply accumulate calculation on the current column of the first matrix and the current row of the second matrix, any element of the current column is provided to a corresponding multiply accumulate unit row among a plurality of multiply accumulate unit rows of the multiply accumulate circuit, and any element of the current row is provided to a corresponding multiply accumulate unit column among a plurality of multiply accumulate unit columns of the multiply accumulate circuit.

9. An operation method of a matrix calculation device, the matrix calculation device being configured to perform a matrix multiplication of a first matrix multiplying a second matrix, the operation method comprising:
   pre-fetching at least one column of the first matrix from a storing unit of the matrix calculation device to act as pre-fetch data by a pre-fetch circuit of the matrix calculation device; pre-fetching at least one row of the second matrix from the storing unit to act as the pre-fetch data by the pre-fetch circuit; or pre-fetching at least one column of the first matrix and at least one row of the second matrix from the storing unit to act as the pre-fetch data by the pre-fetch circuit; and
   determining whether contents of a current column of the first matrix are all 0 by the control circuit according to the pre-fetch data, so as to decide whether to skip the multiply accumulate calculation performed on the current column and the current row; or determining whether contents of a current row of the second matrix are all 0 by the control circuit according to the pre-fetch data, so as to decide whether to skip the multiply accumulate calculation performed on the current column and the current row.

10. The operation method according to claim 9, further comprising:

in the case that the pre-fetch circuit pre-fetches at least one column of the first matrix from the storing unit to act as the pre-fetch data, when the contents of the current column in the pre-fetch data are all 0, skipping fetching the current row from the storing unit by the control circuit, such that the multiply accumulate circuit does not perform the multiply accumulate calculation on the current column of the first matrix and the current row of the second matrix.

11. The operation method according to claim 9, further comprising:

in the case that the pre-fetch circuit pre-fetches at least one column of the first matrix from the storing unit to act as the pre-fetch data, when the contents of the current column in the pre-fetch data are not all 0, fetching the current row from the storing unit by the control circuit; and providing the current column and the current row to the multiply accumulate circuit by the control circuit to execute the multiply accumulate calculation.

12. The operation method according to claim 9, further comprising:

wherein in the case that the pre-fetch circuit pre-fetches at least one row of the second matrix from the storing unit to act as the pre-fetch data, when the contents of the current row in the pre-fetch data are all 0, skipping fetching the current column from the storing unit by the control circuit, such that the multiply accumulate circuit does not perform the multiply accumulate calculation on the current column of the first matrix and the current row of the second matrix.

13. The operation method according to claim 9, further comprising:

in the case that the pre-fetch circuit pre-fetches at least one row of the second matrix from the storing unit to act as the pre-fetch data, when the contents of the current row in the pre-fetch data are not all 0, fetching the current column from the storing unit by the control circuit; and providing the current column and the current row to the multiply accumulate circuit by the control circuit to execute the multiply accumulate calculation.

14. The operation method according to claim 9, further comprising:

in the case that the pre-fetch circuit pre-fetches at least one column of the first matrix and at least one row of the second matrix from the storing unit to act as the pre-fetch data, when the contents of the current column in the pre-fetch data are all 0 or when the contents of the current row in the pre-fetch data are all 0, not providing the current column and the current row to the multiply accumulate circuit by the control circuit, such that the multiply accumulate circuit does not perform the multiply accumulate calculation on the current column of the first matrix and the current row of the second matrix.

15. The operation method according to claim 9, further comprising:

in the case that the pre-fetch circuit pre-fetches at least one column of the first matrix and at least one row of the second matrix from the storing unit to act as the pre-fetch data, when the contents of the current column in the pre-fetch data are not all 0 and when the contents of the current row in the pre-fetch data are not all 0, providing the current column and the current row to the multiply accumulate circuit by the control circuit to execute the multiply accumulate calculation.

16. The operation method according to claim 9, further comprising:

when the control circuit decides to perform the multiply accumulate calculation on the current column of the first matrix and the current row of the second matrix, providing any element of the current column to a corresponding multiply accumulate unit row among a plurality of multiply accumulate unit rows of the multiply accumulate circuit, and providing any element of the current row to a corresponding multiply accumulate unit column among a plurality of multiply accumulate unit columns of the multiply accumulate circuit.

* * * * *